United States Patent [19]
Gilbo et al.

[11] 3,973,854
[45] Aug. 10, 1976

[54] CONNECTORS FOR TUBULAR FRAMING MEMBERS

[75] Inventors: Charles F. Gilbo; Alan S. Glassman, both of Lancaster, Pa.

[73] Assignee: Armstrong Cork Company, Lancaster, Pa.

[22] Filed: May 23, 1975

[21] Appl. No.: 580,204

[52] U.S. Cl. ............................. 403/170; 403/231; 52/753 D; 403/171; 403/176
[51] Int. Cl.² ...................... F16B 7/00; F16D 1/00; F16D 3/00
[58] Field of Search ........................ 403/170–178, 403/187, 49, 189, 201, 231, 347, 406; 52/753 C, 753 D, 754, 637, 638; 297/440; 312/140; 46/27–29, 12

[56] References Cited
UNITED STATES PATENTS

| | | | |
|---|---|---|---|
| 3,386,590 | 6/1968 | Gretz | 403/171 X |
| 3,419,970 | 1/1969 | Wanderman | 46/29 X |
| 3,791,091 | 2/1974 | Albrizzi | 403/173 X |
| 3,835,354 | 9/1974 | Torres-Pena | 403/231 X |

FOREIGN PATENTS OR APPLICATIONS

| | | | |
|---|---|---|---|
| 66,821 | 3/1957 | France | 403/173 |
| 1,160,827 | 3/1958 | France | 403/173 |

*Primary Examiner*—Wayne L. Shedd

[57] ABSTRACT

Furniture and room components are assembled in various combinations to form a wide variety of furniture units or room partition units, with the units easily disassembled when desired. The components include vertical support members, horizontal connecting members and connecting joints therefor.

5 Claims, 8 Drawing Figures

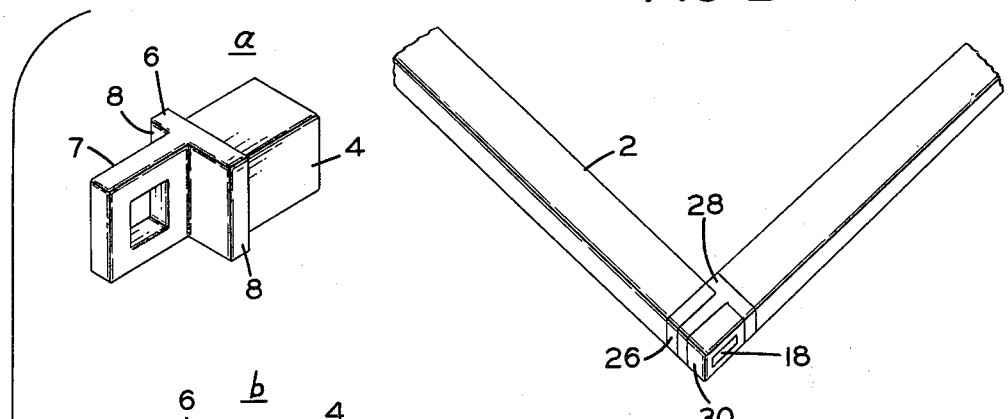
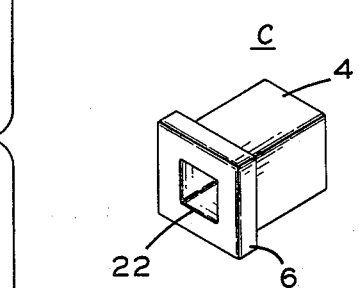
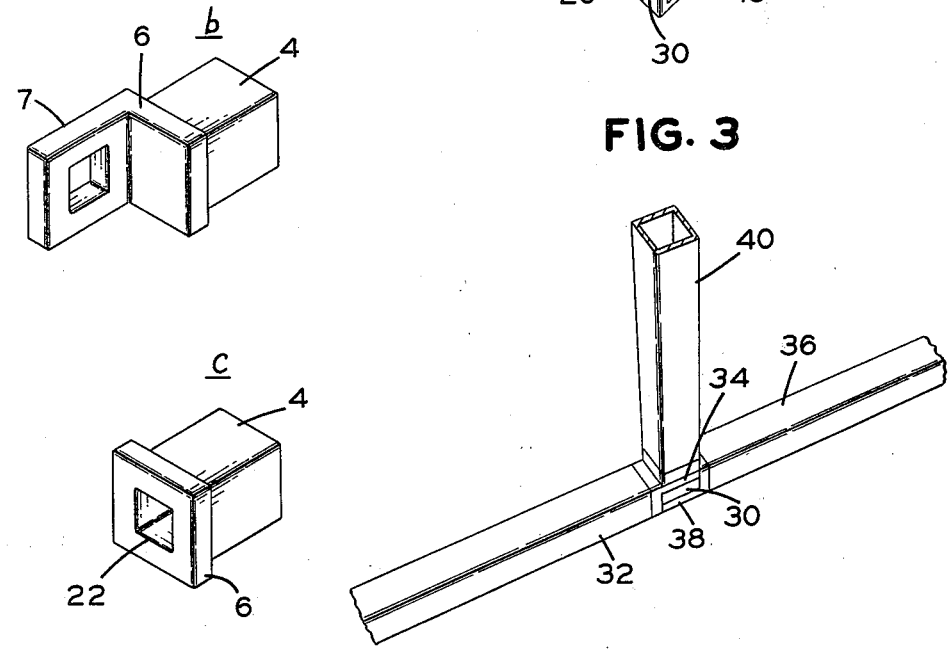
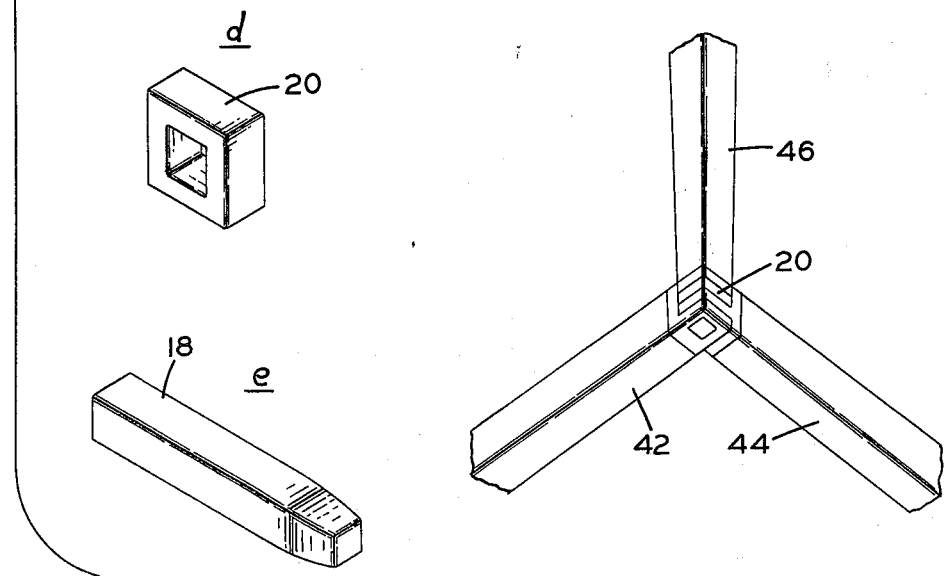

CONNECTORS FOR TUBULAR FRAMING MEMBERS

BACKGROUND OF THE INVENTION

1. Field of the Invention

The present invention pertains to furniture and room partition construction. More particularly, the present invention pertains to components which can be readily assembled to form a wide variety of furniture units or room partition units with the units easily disassembled when desired due to the particular connecting joints used to assemble the various components together.

2. Description of the Prior Art

The majority of furniture units available are preassembled in a fixed configuration. This, to a degree, limits their adaptability to different locations. Often, a person has a particular location in which he desires to have a particular type of furniture unit, only to find that there are no furniture units of the desired type available which would fit the location or that only a very limited number of satisfactory furniture units are available with little selection of style. It also frequently occurs that a furniture unit is obtained for a particular location in a person's house, but that subsequently the person moves to a different home having no location suitable for the particular furniture unit. Consequently, in such situations, it is necessary for the person to dispose of the furniture unit and obtain a new one suitable for the new location. This difficulty can occur even when the person has not moved to a new home, for example, should the person choose to rearrange the furniture in his home.

Many furniture units having the same function have different designs to provide a variety of sizes and styles. If the furniture units are provided as finished items, this variety necessitates a laborious and costly manufacturing process. Furniture components have been provided from which a plurality of furniture items can be assembled and disassembled as desired. However, often these furniture components have little strength and so the resulting furniture items have been unable to support more than a nominal load.

Likewise, room partitions are frequently desired to divide or rearrange the layout of a room. Often it is desired to have such partitions relatively readily movable so that the room partitioning or layout can be arranged rapidly and with only small effort. Typical of some of the prior art structures are those set forth in the following list of U.S. patents.

The first patent is U.S. Pat. No. 3,278,209 which shows a connector joint for fastening together tubular frame members. The connector member is screwed into a receptacle in a tubular frame member.

U.S. Pat. No. 2,604,342 discloses a connector member for tubular elements wherein the connector members are plugged together and held in place by screw-type fastening means.

U.S. Pat. No. 3,089,716 discloses a connector member for tubular elements wherein the connector member will plug into tubular members and be held in position by screw-type fastening means.

Finally, U.S. Pat. No. 3,835,354 discloses a connector joint for furniture members wherein the connector members are plugged into tubular elements and held together by screw-type fastening means.

The present invention is an arrangement of components adapted for ready assembly in a variety of combinations to provide a variety of furniture units and a variety of room partition units. The units can be readily disassembled and reassembled to permit alteration of the designs and to permit easy moving of the units from one location to another. Since the wide variety of units are assembled from a relatively limited number of fixed components, the components can be produced in large quantities, thus reducing the manufacturing cost.

SUMMARY OF THE INVENTION

The present invention is an arrangement of components adapted for ready assembly in a variety of combinations to provide a variety of furniture units and a variety of room partition units. The units can be readily disassembled and reassembled to permit alteration of the designs and to permit easy moving of the units from one location to another. A plurality of hollow, square-section tubular members are connected together by connecting joint components. The joint components are inserted tightly into the ends of the tubular members and due to the different configurations of the joint components, the different joint components will hold the tubular members in different angular relationships.

The joint components are basically composed of a short body portion which is inserted into the tubular member and a protrusion thereon in the form of a square ring. The square ring is positioned relative the body portion of the joint component so that a plurality of tubular members may be positioned together to form a joint that will be locked together by a square pin inserted into the square-ringed protrusions of the joint components. Depending upon the positioning of the protrusion member relative the body portion of the joint component, different numbers of tubular members may be joined together at any one intersection or corner.

BRIEF DESCRIPTION OF THE DRAWING

FIG. 1, a–e, is a showing of the different joint components used herein;

FIG. 2 is one type of joint assembly;

FIG. 3 is another type of joint assembly;

FIG. 4 is another type of joint assembly;

DESCRIPTION OF THE PREFERRED EMBODIMENTS

Figure 5:
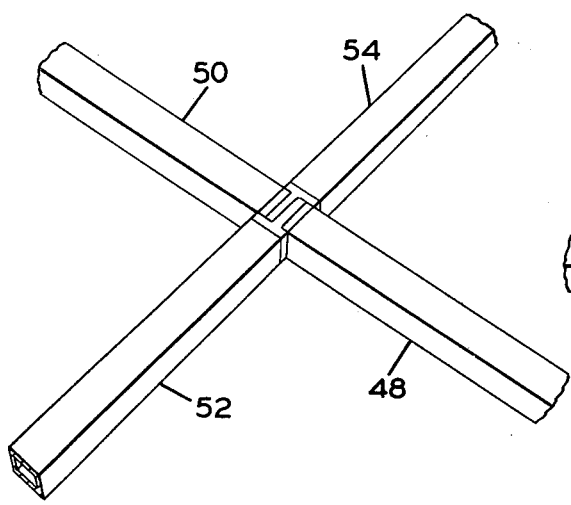
FIG. 5 is another type of joint assembly.

Different furniture and room components can be assembled from the tubular rod and joint components below described in the same manner as shown in U.S. Pat. No. 3,835,354. The invention herein resides not in the design of different furniture components, but in the design of a joint structure for the support members of furniture components. The support members for the furniture components are the square tubular members 2 shown in FIG. 2. The invention need not be restricted just to square tubular rods, and the rods could be of any particular cross section. A square cross section is particularly adaptable to use in the furniture components of U.S. Pat. No. 3,835,354 and have appeared to be aesthetically pleasing to designers of furniture components. The rods need not be tubular throughout, but could be solid bars with a socket in their ends to receive the joint components. However, tubular rods have sufficient strength as compared with solid bars for the purposes intended and a substantial weight reduction can be secured when using tubular rods rather than solid bars with sockets in the ends thereof. The important feature is that the support member have an end which can receive the joint component.

The different joint components are shown in FIG. 1. Joint components a, b, and c are provided with a body portion 4. The body portion 4 is sized so that it will fit within the tubular end portion of the support member 2. The size of the body portion 4 is just slightly oversize relative to the inside size of the tubular member 2 so that the joint component may be frictionally held in the socket end of the support member 2. A shoulder 6 is provided on the body member 4 to limit the extent of insertion of the body member 4 into the socket end of the tubular member 2. The shoulder 6 has an outside side dimension which is approximately the same as the outside side dimension of the tubular rod. The surface of the shoulder 6 is also provided with a high polish so that it provides a finished appearance and blends in with the outside surface of the tubular rod 2.

The joint components a, b, and c of FIG. 1 will be made in one of three configurations. In the configuration a, the joint component is provided with a square ring which extends from the shoulder 6 and is positioned on the side of the shoulder 6 opposite from the body 4. The square ring is provided with an outside side dimension which is equal to the outside side dimension of the shoulder 6. It is provided with a square aperture therethrough. The square ring in FIG. 1a is of a thickness equal to one-quarter the outside side dimension of the shoulder 6. The square rings may be positioned either in the position shown for FIG. 1b or the position shown for the FIG. 1a. In FIG. 1b, the square ring has one surface 7 flush with one side of the shoulder 6. This would be called the "first quarter position". The showing in FIG. 1a is with the square ring moved into what would be called the "second quarter position". That means that the surface 7 of the square ring is positioned from the side 8 of the shoulder 6 a distance equal to the thickness of the square ring. The so-called "third quarter position" is really the same as the "second quarter position". The "fourth quarter position" is the same as the "first quarter position" shown in FIG. 1b.

Therefore, it can be seen that four joint components can be positioned together 90° apart with one joint component having its square ring in the first quarter position, the second joint component having its square ring in the second quarter position, the third joint component having its square ring in the third quarter position, and the final joint component having its square ring in the fourth quarter position. This type configuration would yield a structure similar to FIG. 7 wherein the tubular members 10, 12, 14 and 16 are positioned in the same plane and 90° apart. The square rings would all be lined up so that the pin 18 can pass through the square apertures in the square rings to fasten the four square rings together.

Three additional joint components would be used. Two of them would be similar to filler or spacer part 20 shown in FIG. 1d. This part 20 is nothing more than a square ring filler or spacer which may have a thickness of either one-quarter or one-half of the thickness of the square ring of FIG. 1a. The final joint component is the element shown in FIG. 1c wherein a body portion 4 is provided with a shoulder 6 and then rather than having a projection, there is provided an aperture 22 which extends through the body portion 4 of the joint component. This aperture is sized to receive the pin 18. By using the components a through e of FIG. 1, it will then be possible to form the following joint structures.

The joint of FIG. 2 will be composed of a joint component 26 which is similar to the structure of FIG. 1c and a second quarter joint component 28 which is similar to that of FIG. 1a and a square ring 30 which is made with a thickness twice that of the square rings of 26 and 28. A pin 18 would now pass down through elements 26, 28 and 30 to fasten these three components together.

In FIG. 3 there is provided a joint structure wherein rod 32 is provided with a first quarter section 34 and rod 36 is provided with a first quarter section 38 which is rotated 180° from the configuration of member 34 and therebetween there is placed a square ring 30 having a thickness equal to twice that of the square rings of members 34 and 38. A pin would then be passed through those members. Rod 40 would be provided with a joint component similar to FIG. 1c, and a square pin would connect the three rods 32, 36 and 40 together.

FIG. 4 is the same basic structure as FIG. 3 except member 42 and 44 are 90° apart, whereas elements 32 and 36 of FIG. 3 were 180° apart. FIG. 4 also involves a further modification wherein element 42 is provided with a first quarter joint component, and element 44 is provided with a second quarter joint component, and then thereover is placed a square ring 20 with a thickness equal to that of the square rings of members 42 and 44. Then the joint component of element 46, which joint component is similar to FIG. 1c, will be positioned down over the square ring 20 to form the fourth quarter of the joint assembly. Consequently, elements 42 and 44 would appear to have shoulder ends (shoulers 6), whereas element 46 would be provided without a shoulder end element.

FIG. 5 shows a structure wherein two elements, 48 and 50, are provided with ends similar to those of FIG. 1c and elements 52 and 54 are provided with second quarter sections and the assembly is put together in the manner shown in FIG. 5.

Figure 6:
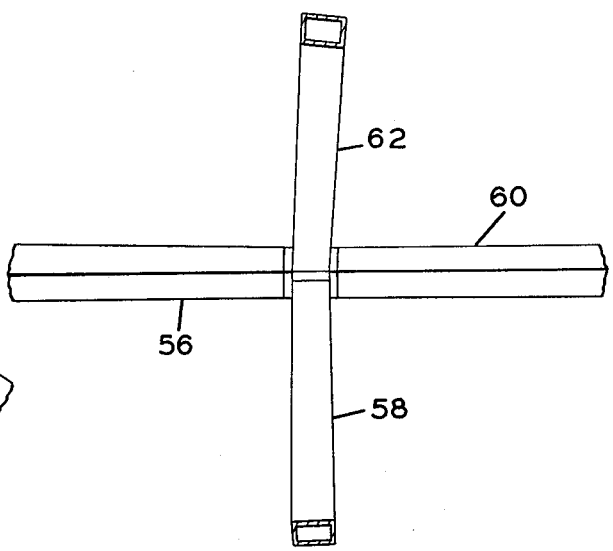
FIG. 6 is another type of joint assembly.

FIG. 6 is similar to the showing of FIG. 5 except that one of the support members is rotated 90° and thus, instead of having the four support members in a single plane, three support members are in a single plane and the fourth support member extends perpendicular thereto. This structure would be put together using a first quarter joint component with element 56, a second quarter joint component with element 58, a third quarter joint component with element 60 and joint component similar to FIG. 1c with element 62.

Figure 7:
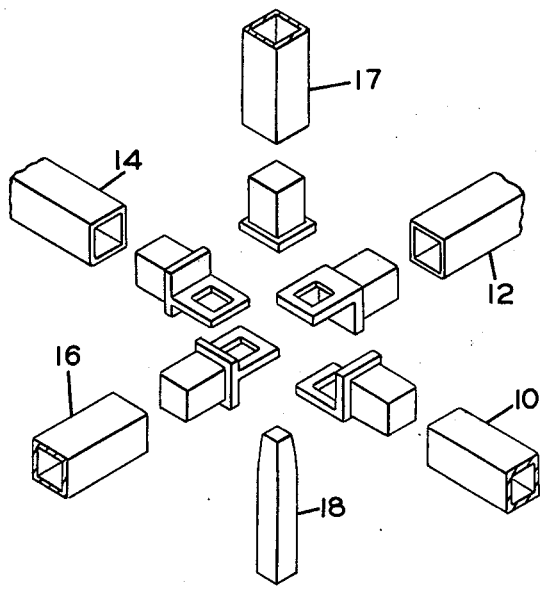
FIG. 7 is another type of joint assembly.

FIG. 7 is an exploded view of a five-member joint construction which is assembled by using different quarter section joints for each of the elements 10, 12, 14, and 16 and assembling these together with the fifth support element 17 having an end connector similar to that of FIG. 1c of the drawing.

Figure 8:
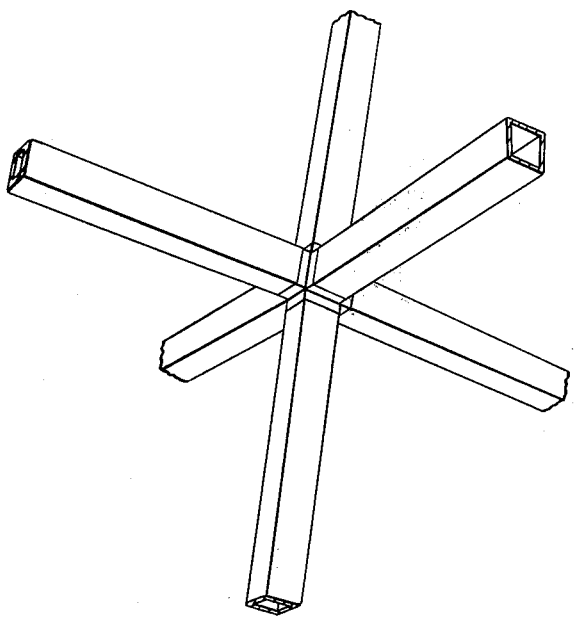
FIG. 8 is another type of joint assembly.

Finally in FIG. 8, there is shown a joint construction with six elements connected together. This is really nothing more than the structure of FIG. 7 wherein an additional element is extended to the sixth side of the structure. This structure would be put together with four elements having different quarter section joint components and two elements having joint components similar to that structure shown in FIG. 1c.

In the structure shown, the tubular rod elements are generally 1 inch (2.5 cm) square and are made of aluminum, but may be of other materials and other dimensions. The connecting members are generally made of metal and each of the quarter sections has an aperture therethrough of approximately ½ inch (1.2 cm). The pin 18 is approximately ½ inch (1.2 cm) square and will frictionally fit within the square apertures of the different joint components.

What is claimed is:

1. Components capable of assembly into furniture and room units comprising:
   a. support members, each having sockets in the ends thereof,
   b. joint components comprising:
      1. a body member which is sized to be inserted into the socket of a support member and held frictionally thereby,
      2. an apertured means extending from said body member and receiving a connecting element, said apertured means being of the same configuration as the cross-section of said support member and having its aperture axis at a 90° angle relative to the axis of said support member, said apertured means being a protusion, the plane of which is extending substantially perpendicular from said body member, said protrusion having its shaped configuration in the above-said plane, and said protrusion having a thickness across the above-said plane of one quarter the dimension of said shaped configuration and said thickness is also equal to one quarter the cross-sectional dimension of the support member,
      3. a shoulder member between said body member and said apertured means,
   c. and a connecting element passing through said apertured means for fastening together a plurality of support members having joint components fastened thereto, and
   d. the improvement comprising positioning of the protrusion in its above-said plane at selected points relative one side of the support member,
      1. said selected points being any one of four positions, the first one of which having one planar surface of said protrusion in the plane containing one edge of said shoulder member, the second position having said planar surface of the protrusion spaced the thickness of said protrusion from said one edge of said shoulder member, the third position having said planar surface of the protrusion spaced twice the thickness of said protrusion from said one edge of said shoulder member, and the fourth position having said planar surface of said protrusion spaced three times the thickness of said protrusion from said one edge of said shoulder member.

2. Components capable of assembly into furniture and room units as set forth in claim 1 wherein:
   a. said shoulder member being of the same shape and size as the cross section of the support member.

3. Components capable of assembly into furniture and room units as set forth in claim 1 wherein:
   a. said apertured means contains a polygonal aperture and a polygonal pin passes through said aperture to fasten a plurality of joint components together.

4. Components capable of assembly into furniture and room units as set forth in claim 3 wherein:
   a. said pin being inserted into a joint component which does not contain an apertured protrusion extending from the body member of the joint component and said body member of the joint component has an aperture therein for receiving said pin.

5. Components capable of assembly into furniture and room units as set forth in claim 4 wherein:
   a. spacer members are used with the joint components when less than four support members are connected together.

* * * * *